(12) United States Patent
Schroetz et al.

(10) Patent No.: US 9,102,787 B2
(45) Date of Patent: Aug. 11, 2015

(54) CURABLE COMPOSITIONS

(75) Inventors: Markus Schroetz, Ochsenhausen (DE); Eva-Maria Michalski, Sinzheim (DE); Klaus Reinhold, Senden-Witzighausen (DE); Christina Fritsche, Eberhardzell (DE)

(73) Assignee: Blue Cube IP LLC, Midland, MI (US)

( * ) Notice: Subject to any disclaimer, the term of this patent is extended or adjusted under 35 U.S.C. 154(b) by 362 days.

(21) Appl. No.: 13/508,450

(22) PCT Filed: Nov. 12, 2010

(86) PCT No.: PCT/US2010/002963
§ 371 (c)(1),
(2), (4) Date: May 7, 2012

(87) PCT Pub. No.: WO2011/059500
PCT Pub. Date: May 19, 2011

(65) Prior Publication Data
US 2012/0259040 A1   Oct. 11, 2012

Related U.S. Application Data

(60) Provisional application No. 61/281,161, filed on Nov. 13, 2009.

(51) Int. Cl.
*B32B 27/38* (2006.01)
*C09D 163/00* (2006.01)
*C08G 59/38* (2006.01)
*C08G 59/50* (2006.01)
*C08G 59/62* (2006.01)
*C08G 59/18* (2006.01)
*C08L 63/00* (2006.01)

(52) U.S. Cl.
CPC ............ *C08G 59/623* (2013.01); *C08G 59/184* (2013.01); *C08L 63/00* (2013.01); *C09D 163/00* (2013.01)

(58) Field of Classification Search
None
See application file for complete search history.

(56) References Cited

U.S. PATENT DOCUMENTS

| 3,240,376 A | 3/1966 | Smith et al. |
| 4,088,633 A * | 5/1978 | Gurney ........................ 528/99 |
| 4,269,742 A | 5/1981 | Goeke et al. |
| 4,612,214 A * | 9/1986 | Salvi ............................ 427/136 |
| 6,916,505 B2 | 7/2005 | Raymond et al. |
| 2007/0264506 A1 | 11/2007 | Wigger |
| 2009/0226729 A1 * | 9/2009 | Niimoto et al. ............... 428/416 |

FOREIGN PATENT DOCUMENTS

| EP | 0684268 | 11/1995 | |
| EP | 1788048 | 5/2007 | |
| EP | 1813634 | 8/2007 | |
| KR | 20020053472 | 7/2002 | |
| KR | 20060077820 | 7/2006 | |
| KR | 20070070882 | 7/2007 | |
| WO | 01/72869 | 10/2001 | |
| WO | WO 2006016625 A1 * | 2/2006 | ........... C09D 163/00 |
| WO | 2007060091 | 5/2007 | |

OTHER PUBLICATIONS

Registry Data for 126981-97-3, provided by STN (no date).*
International Search Report and Written Opinion from related PCT application PCT/US2010/002963 dated Jun. 29, 2011, 11 pages.
Tramontini, "Advances in the Chemistry of Mannich Bases", Synthesis, Dec. 1973, 703-775.

* cited by examiner

*Primary Examiner* — Michael J Feely
(74) *Attorney, Agent, or Firm* — Brooks, Cameron & Huebsch, PLLC

(57) ABSTRACT

Embodiments include curable compositions including a resin component and a hardener component. The resin component can include an epoxy compound that is selected from the group consisting of aromatic epoxy compounds, alicyclic epoxy compounds, aliphatic epoxy compounds, and combinations thereof, and a reactive diluent that includes a polymeric glycidyl ether. The hardener component can include an adduct and a Mannich base.

9 Claims, No Drawings

US 9,102,787 B2

CURABLE COMPOSITIONS

This application is a National Stage application under 35 U.S.C. 371 of PCT/US2010/002963, filed on Nov. 12, 2010 and published as WO2011/059500 A2 on May 19, 2011, which claims the benefit of U.S. Provisional Application Ser. No. 61/281,161 filed Nov. 13, 2009, the entire contents of which are incorporated herein by reference in its entirety.

FIELD OF DISCLOSURE

This disclosure relates to curable compositions, and in particular curable compositions that include a resin component and a hardener component.

BACKGROUND

Epoxy systems consist of two components that can chemically react with each other to form a cured epoxy, which is a hard, duroplastic material. The first component is an epoxy resin and the second component is a curing agent, sometimes called a hardener. Epoxy resins are substances or mixtures which contain epoxide groups. The hardener can include compounds which are reactive to the epoxide groups of the epoxy resins.

The epoxy resins can be crosslinked, also referred to as curing, by the chemical reaction of the epoxide groups and the compounds of the hardener. This curing converts the epoxy resins, which have a relatively low molecular weight, into relatively high molecular weight materials by chemical addition of the compounds of the hardener. Additionally, the hardener can contribute to many of the properties of the cured epoxy.

Some of the hardeners, however, suffer from the disadvantage that they contain up to 50 weight percent free (alkyl) phenol and/or volatile organic compounds like benzyl alcohol. Volatile organic compounds are defined in various terms depending upon region. For example, in the European Union one definition of a volatile organic compound is any organic compound having an initial boiling point less than or equal to 250 degrees Celsius measured at a standard atmospheric pressure of 101.3 kilopascal.

In recent years due to environmental concerns and governmental regulations, there have been increased efforts made to develop curable epoxy systems which contain a minimum of volatile organic compounds and/or comply with governmental regulations.

As noted above, epoxy resins can be crosslinked in order to develop certain characteristics. Blushing can occur during the crosslinking. Blushing, sometimes also referred to as whitening, can occur when moisture, such as atmospheric water or water that originates from within a porous substrate together with atmospheric carbon dioxide, reacts with a curable composition having a hardener that includes an amine compound. Amine compounds on the surface of the curable composition can combine with the water and the carbon dioxide to form carbamates. The amine compounds, which were intended to react with the epoxide groups of the epoxy resins, are consumed and thus not all epoxy resins can crosslink during curing. Blushing can produce white patches or hazy effect portions in clear coatings. This can contribute to discoloration over time, and may cause lack of gloss in pigmented coatings. Furthermore, blushing can affect the coating performance and result in poor overcoatability. Poor overcoatability is the insufficient adhesion of a subsequent coating layer due to a surface energy modification associated with the blushing.

SUMMARY

The present disclosure provides one or more embodiments of curable compositions. For one or more of the embodiments, the curable compositions include a resin component and a hardener component. The resin component includes an epoxy compound and a reactive diluent. The epoxy compound is selected from the group consisting of aromatic epoxy compounds, alicyclic epoxy compounds, aliphatic epoxy compounds, and combinations thereof. The reactive diluent includes a polymeric glycidyl ether. The hardener component includes an adduct and a Mannich base.

For one or more of the embodiments, the present disclosure provides an article that includes a substrate and a coating on the substrate, wherein the coating includes a cured composition that is obtained from the curable compositions, as described herein.

DETAILED DESCRIPTION

"Polymer" and "polymeric" as used herein refer to compounds having a structure that results mainly from the repetition of low molar mass units (monomers), such that over 50 percent of the weight for that compound consists of polymer molecules. A "polymer molecule" is a molecule that contains a sequence of at least 3 monomer units, which are covalently bound to at least one other monomer unit or other reactant; the amount of molecules presenting the same molecular weight must be less than 50 weight percent of the substance.

"Volatile organic compound" as used herein refers to an organic compound having an initial boiling point less than or equal to 250 degrees Celsius measured at a standard atmospheric pressure of 101.3 kilopascal.

"Pot life" as used herein refers to a period of time, at a given temperature, that a mixture of a resin component and a hardener component remains workable for a particular application. One method of determining pot life includes placing a 100 gram mixture of a resin component and a hardener component into a container. A coiled steel wire moves up and down through the mixture at a moderate speed. As the viscosity of the mixture increases during the curing, the mixture turns viscous in the course of the curing reaction the wire is no longer able to move through the mixture and the mixture and the container are lifted to activate a switch. The pot life can be defined as the time period beginning when the resin component and the hardener component are mixed and ending when the switch is activated.

The curable compositions of the present disclosure include a resin component and a hardener component. For one or more of the embodiments, the resin component includes an epoxy compound, which refers to a compound in which an oxygen atom is directly attached to two adjacent or non-adjacent carbon atoms of a carbon chain or ring system.

The epoxy compound is selected from the group consisting of aromatic epoxy compounds, alicyclic epoxy compounds, aliphatic epoxy compounds, and combinations thereof. Examples of aromatic epoxy compounds include, but are not limited to, glycidyl ether compounds of polyphenols, such as hydroquinone, resorcinol, bisphenol A, bisphenol F, 4,4'-dihydroxybiphenyl, novolac, tetrabromobisphenol A, 2,2-bis(4-hydroxyphenyl)-1,1,1,3,3,3-hexafluoropropane, and 1,6-dihydroxynaphthalene.

Examples of alicyclic epoxy compounds include, but are not limited to, polyglycidyl ethers of polyols having at least one alicyclic ring, or compounds including cyclohexene oxide or cyclopentene oxide obtained by epoxidizing compounds including a cyclohexene ring or cyclopentene ring with an oxidizer. Some particular examples include, but are not limited to hydrogenated bisphenol A diglycidyl ether; 3,4-epoxycyclohexylmethyl-3,4-epoxycyclohexyl carboxylate; 3,4-epoxy-1-methylcyclohexyl-3,4-epoxy-1-methylhexane carboxylate; 6-methyl-3,4-epoxycyclohexylmethyl-6-methyl-3,4-epoxycyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate; bis(3,4-epoxycyclohexylmethyl)adipate; methylene-bis(3,4-epoxycyclohexane); 2,2-bis(3,4-epoxycyclohexyl)propane; dicyclopentadiene diepoxide; ethylene-bis(3,4-epoxycyclohexane carboxylate); dioctyl epoxyhexahydrophthalate; and di-2-ethylhexyl epoxyhexahydrophthalate.

Examples of aliphatic epoxy compounds include, but are not limited to, polyglycidyl ethers of aliphatic polyols or alkylene-oxide adducts thereof, polyglycidyl esters of aliphatic long-chain polybasic acids, homopolymers synthesized by vinyl-polymerizing glycidyl acrylate or glycidyl methacrylate, and copolymers synthesized by vinyl-polymerizing glycidyl acrylate or glycidyl methacrylate and other vinyl monomers. Some particular examples include, but are not limited to glycidyl ethers of polyols, such as 1,4-butanediol diglycidyl ether; 1,6-hexanediol diglycidyl ether; a triglycidyl ether of glycerin; a triglycidyl ether of trimethylol propane; a tetraglycidyl ether of sorbitol; a hexaglycidyl ether of dipentaerythritol; a diglycidyl ether of polyethylene glycol; and a diglycidyl ether of polypropylene glycol; polyglycidyl ethers of polyether polyols obtained by adding one type, or two or more types, of alkylene oxide to aliphatic polyols such as propylene glycol, trimethylol propane, and glycerin; and diglycidyl esters of aliphatic long-chain dibasic acids.

For one or more of the embodiments, the resin component further includes a reactive diluent. Reactive diluents are compounds that participate in a chemical reaction with the hardener component during the curing process and become incorporated into the cured composition. Reactive diluents can also be used to vary the viscosity and/or cure properties of the curable compositions for various applications. For some applications reactive diluents can impart a lower viscosity to influence flow properties, extend pot life and/or improve adhesion properties of the curable compositions. For one or more of the embodiments, the reactive diluent is less than 60 weight percent of a total weight of the resin component.

For one or more of the embodiments, the reactive diluent is a polymeric glycidyl ether. The polymeric glycidyl ether is formed from units which include polyalkylen oxide reacted with epichlorohydrin to form glycidyl ethers. The glycidyl ether can be selected from the group consisting of allyl glycidyl ethers, diglycidyl ethers, phenyl glycidyl ethers, alkyl glycidyl ether, and combinations thereof. Sometimes, polymeric glycidyl ethers can be formed by a reaction of mono- to poly-hydroxyl compounds with alkylen oxides and a conversion of the polyetherpolyol reaction product into a glycidyl ether with epichlorohydrin and subsequent treatment of the former intermediate with an aqueous sodium hydroxide (NaOH) solution. The polymeric glycidyl ether has an average molecular weight of from 650 to 1450. An example of the polymeric glycidyl ether includes, but is not limited to, a triglycidyl ether of trimethylolpropan octadeca ethoxilate.

For one or more of the embodiments, the hardener component includes an adduct. Adducts are less hygroscopic and have a lower vapor pressure compared to some non-adducted amines, as discussed above, and can help prevent blushing.

The adducts are formed by combination of two or more separate compounds. Compound refers to a substance composed of atoms or ions of two or more elements in chemical combination. Herein, the two separate compounds that are combined are the epoxy compound and a first amine. An amine is a compound that contains an N—H moiety. The adducts are a reaction product of the addition reaction of the epoxy compound and the first amine. The two separate compounds are combined such that there is change in connectivity but no loss of atoms within the compounds. For one or more of the embodiments an equivalent ratio of one to one, epoxy compound to first amine, is employed when forming the adduct. However, embodiments are not limited to this equivalent ratio of epoxy compound to first amine when forming the adduct and other equivalent ratios are possible. For one or more of the embodiments, the adduct is from 10 weight percent to 90 weight percent of a total weight of the hardener component.

For one or more of the embodiments, the first amine is selected from the group consisting of aliphatic polyamines, arylaliphatic polyamines, cycloaliphatic polyamines, aromatic polyamines, heterocyclic polyamines, polyalkoxypolyamines, and combinations thereof. The alkoxy group of the polyalkoxypolyamines is an oxyethylene, oxypropylene, oxy-1,2-butylene, oxy-1,4-butylene or a co-polymer thereof.

Examples of aliphatic polyamines include, but are not limited to ethylenediamine (EDA), diethylenetriamine (DETA), triethylenetetramine (TETA), trimethyl hexane diamine (TMDA), hexamethylenediamine (NMDA), N-(2-aminoethyl)-1,3-propanediamine ($N_3$-Amine), N,N'-1,2-ethanediyl-bis-1,3-propanediamine ($N_4$-amine), and dipropylenetriamine. Examples of arylaliphatic polyamines include, but are not limited to m-xylylenediamine (mXDA), and p-xylylenediamine. Examples of cycloaliphatic polyamines include, but are not limited to 1,3-bisaminocyclohexylamine (1,3-BAC), isophorone diamine (IPDA), and 4,4'-methylenebiscyclohexanamine. Examples of aromatic polyamines include, but are not limited to m-phenylenediamine, diaminodiphenylmethane (DDM), and diaminodiphenylsulfone (DDS). Examples of heterocyclic polyamines include, but are not limited to N-aminoethylpiperazine (NAEP), and 3,9-bis(3-aminopropyl) 2,4,8,10-tetraoxaspiro(5,5)undecane. Examples of polyalkoxypolyamines where the alkoxy group is an oxyethylene, oxypropylene, oxy-1,2-butylene, oxy-1,4-butylene or a co-polymer thereof include, but are not limited to 4,7-dioxadecane-1,10-diamine, 1-propanamine,2,1-ethanediyloxy))bis(diaminopropylated diethylene glycol) (ANCAMINE® 1922A); poly(oxy(methyl-1,2-ethanediyl)), alpha-(2-aminomethylethyl)omega-(2-aminomethylethoxy) (JEFFAMINE® D-230, D-400); triethyleneglycoldiamine and oligomers (JEFFAMINE® XTJ-504, JEFFAMINE® XTJ-512), poly(oxy(methyl-1,2-ethanediyl)),alpha,alpha'-(oxydi-2,1-ethanediyl)bis(omega-(aminomethylethoxy)) (JEFFAMINE® XTJ-511); bis(3-aminopropyl)polytetrahydrofuran 350; bis(3-aminopropyl)polytetrahydrofuran 750; poly(oxy(methyl-1,2-ethanediyl)), a-hydro-w-(2-aminomethylethoxy) ether with 2-ethyl-2-(hydroxymethyl)-1,3-propanediol (JEFFAMINE® T-403), and diaminopropyl dipropylene glycol.

The adducts may have a viscosity of 500 mPa·s t650,000 mPa·s. The adducts may have a hydrogen equivalent weight of 60 grams per equivalent (g/eq) to 200 g/eq. The viscosity and/or the hydrogen equivalent weight can depend, at least in part, on an initial molar ratio of the epoxy compound and the first amine. However, embodiments are not limited to these values and other viscosities and/or hydrogen equivalent weights are possible. For some applications the adducts may have a viscosity of 3,000 mPa·s to 7,000 mPa·s.

As mentioned above, the hardener component includes a Mannich base. A Mannich base is a reaction product of the reaction of an aldehyde, a phenol compound, and a second amine. An example of the aldehyde includes, but is not limited to, formaldehyde. The second amine can be independently selected from the same amines and/or groups as the first amine, as discussed herein.

For one or more of the embodiments, the phenol compound used to form the Mannich bases includes monophenols, for example, phenol, ortho-, meta- or para-cresol, the isomeric xylenols, para-tertiary-butylphenol, para-nonylphenol, α-naphthol, and β-naphthol and combinations thereof. The phenol compound can include di- and poly-phenols such as resorcinol, hydroquinone, 4,4'-dioxydiphenyl, 4,4'-dioxydiphenylether, 4,4'-dioxydiphenylsulfone, 4,4'-dioxydiphenylmethane, bisphenol A, and combinations thereof. The phenol compound can include condensation products of phenol and formaldehyde, known as novolacs.

The Mannich base helps provide that the curable composition has a rapid cure time. Herein, the rapid cure time refers to a cure time that is 120 minutes or less. For example, the rapid cure time can be from 5 minutes to 120 minutes when the curable composition is cured at a temperature of from −5° C. to 50° C. Additionally, the Mannich bases help provide desirable mechanical strength and hardness properties, as well as desirable chemical resistance properties.

For one or more of the embodiments, the Mannich base is from 10 to 90 weight percent the total weight of the hardener component, such that the weight percent of the adduct and the weight percent of the Mannich base equal one hundred weight percent of the hardener component. Examples of phenols and/or amines that are useful for one or more of the embodiments can be found in Tramontini, Maurilio, "Advances in the Chemistry of Mannich Bases." Syntheses, 1973: 703-775, incorporated herein by reference.

The Mannich bases may have a viscosity of 100 mPa·s to 10,000 mPa·s; a hydrogen equivalent weight of 60 g/eq to 200 g/eq; and a pot life of from 5 minutes to 60 minutes at 25° C. The viscosity, the hydrogen equivalent weight, and/or the pot life of the Mannich base can depend, at least in part, on an initial molar ratio of the epoxy compound and the second amine. However, embodiments are not limited to these values, and other values for viscosity, hydrogen equivalent weight and/or pot life of the Mannich base are possible. For some applications the Mannich bases may have a viscosity of 3,000 mPa·s to 7,000 mPa·s.

For one or more of the embodiments, the curable compositions do not include volatile organic compounds. The curable compositions may have a viscosity of from 1,000 mPa·s to 10,000 mPa·s at 25° C. The curable compositions may have a pot life of from 15 minutes to 60 minutes at 25° C. In some embodiments, the curable compositions may have a pot life of from 15 minutes to 90 minutes at 25° C. However, embodiments are not limited to these values, and other values for viscosity and/or pot life of the curable composition are possible. For some applications the curable compositions may have a viscosity of 2,000 mPa·s to 8,000 mPa·s.

For one or more of the embodiments, the curable compositions can include an additive. Examples of the additive include, but are not limited to, a modifier such as a non-reactive modifier; an accelerator, a flow control additive such as a solvent or an anti-sag agent, a pigment, a reinforcing agent, a filler, an elastomer, a stabilizer, an extender, a plasticizer, and a flame retardant, depending upon the application. For one or more of the embodiments the curable compositions can include an additional curing agent. The additional curing agent can be selected from the group consisting of an amine, an anhydride, a carboxylic acid, a phenol, a thiol, and combinations thereof.

The curable compositions are advantageous as a coating. The coating can include a cured composition that is obtained by a reaction of the resin component and the hardener component as discussed herein. The curable compositions can be applied to a substrate and cured thereon. For example, the substrate can be metal, plastic, fiberglass, or another material that the curable compositions can bond to. The curable compositions can be applied to the substrate by various procedures, such as dipping, spraying, rolling, or another procedure. The coating on the substrate can be useful for forming articles, such as coated containers that are employed to hold liquids. For example, embodiments of the coated containers may include a potable water container and/or a wine fermentation tank/container. For some applications, the coating on the substrate may be from 0.2 millimeters (mm) to 5 mm thick. However, embodiments are not limited to this value, and other values for coating thickness are possible.

For one or more of the embodiments, the curable compositions can be cured to produce a cured composition having a hardness of from 76 to 84 on a Shore D hardness scale. The hardness can be determined by ASTM D 2240. For one or more of the embodiments, the cured composition has a glass transition temperature of from 40° C. to 80° C. However, embodiments are not limited to these values, other hardness values on the Shore D hardness scale and/or glass transition temperatures are possible.

EXAMPLES

The following Examples of curable compositions including a resin component, a reactive diluent, and a hardener component are given to illustrate, but not limit, the scope of this disclosure. Unless otherwise indicated, all parts and percentages are by weight. Unless otherwise specified, all instruments and chemicals used are commercially available.

Materials

Isophorone diamine (IPDA), available from Evonik Industries.

Para-tertiary-butylphenol (PTBP), available from SI Group®, Inc.

Formaldehyde, available from Brenntag.

D.E.R.™ 331, (aromatic epoxy compound), available from The Dow Chemical Company.

meta-Xylenediamine (MXDA), available from Mitsubishi Gas Chemical Company, Inc.

Diethylene triamine (DETA), available from Delamine B.V.

Trimethyl hexane diamine (TMDA), available from Evonik Industries.

JEFFAMINE® D-230 Polyoxypropylenediamine (D-230), available from Huntsman International LLC.

ortho-Cresyl(mono)glycidyether (oC-MGE), available from UPPC GmbH.

Styrenated phenol (Sanko SP(SP)), (non-reactive modifier), available from Sanko Europe GmbH.

Diisopropylnaphthalene (Ruetasolv DI), (non-reactive modifier), available from RKS GmbH.

POLYPOX® E 403, (aromatic epoxy compound), available from The Dow Chemical Company.

POLYPOX® VE 101592, (reactive diluent of polymeric glycidyl ether that is a triglycidyl ether of trimethylolpropan octadeca ethoxilate), available from UPPC GmbH.

POLYPOX® IH 7009, (polyamine), available from UPPC GmbH.

DOWANOL® TpnB (TpnB), (Tripropylene glycol n-butyl ether), (non-reactive modifier) available from The Dow Chemical Company.

NOVARES LS 500 (LS 500), (non-reactive modifier), available from Ruetgers VfT.

UCAR™ Filmer IBT (IBT), (non-reactive modifier), Chemical Abstracts Service (CAS) registry number 25265-77-4, available from The Dow Chemical Company.

Acetic acid, analytical grade, available from Merck KGaA.

Ethanol, analytical grade, available from Merck KGaA.

Artificial wine, mixture of 3 volume percent (vol %) vinegar having a 5 weight percent (wt %) acetic acid content, 14 vol % ethanol, 83 vol % water.

Sulfuric acid, analytical grade, available from Merck KGaA.

Sodium hydroxide, analytical grade, available from Merck KGaA.

B.P.G 5b, mixture of 48 vol % methanol, analytical grade, available from Merck KGaA, 48 vol % isopropanol, analytical grade, available from Merck KGaA, and 4 vol % water.

Gasoline, available from Esso (Exxon).

Xylene, analytical grade, available from Merck KGaA.

Methyl isobutyl ketone (MIBK), analytical grade, available from Merck KGaA.

Deionized water.

Mannich Base Preparation

Mannich bases 1 through 10 were prepared as follows: A three-necked flask equipped with a mechanical stirrer, a heating jacket, a thermometer, and a Liebig type horizontal cooler, was used to prepare the Mannich bases. IPDA was first added to the flask. Then, PTBP was dissolved in the IPDA at 90° C. Twenty wt % formaldehyde solution was added dropwise to the flask while water, which was introduced from the formaldehyde solution, was simultaneously removed via heating at a temperature of from 100° C. to 135° C. with a pressure of about 101.3 kPa. The resultant product was cooled to 90° C. when the addition of the formaldehyde solution was completed. Subsequently, the resultant product was maintained at 90° C. for 5 minutes (min) and a vacuum of 100 millibar (mbar) was applied. Then, the product was heated to 135° C. The product was distilled to a water content below 0.5 wt %. Thereafter, the product was cooled to 40° C. Table 1 shows components, and their respective amounts in moles, used to prepare the respective Mannich bases. Table 1 also shows the grams of water distilled during the preparation of the respective Mannich bases 1-10.

TABLE 1

| COMPONENT | Mannich Base 1 | Mannich Base 2 | Mannich Base 3 | Mannich Base 4 | Mannich Base 5 | Mannich Base 6 | Mannich Base 7 | Mannich Base 8 | Mannich Base 9 | Mannich Base 10 |
|---|---|---|---|---|---|---|---|---|---|---|
| PTBP (moles) | 1.12 | 0.37 | 0.37 | 0.75 | 1.12 | 0.75 | 0.75 | 1.12 | 1.12 | 0.9 |
| IPDA (moles) | 0.7 | 1.4 | 1.4 | 1.4 | 1.4 | 1.4 | 0.7 | 1.4 | 1.4 | 1.4 |
| Formaldehyde (moles) | 0.35 | 0.7 | 0.35 | 0.35 | 0.35 | 0.7 | 0.35 | 0.7 | 1.05 | 0.6 |
| Distilled water (grams) | 42.81 | 91.6 | 46.1 | 47.2 | 47.9 | 91.65 | 95.13 | 95.12 | 141.88 | 77.78 |

Various properties of Mannich bases 1 through 10 were determined and the results are shown in Table 2; including the theoretical amine value of the respective Mannich bases in milligrams potassium hydroxide per gram (mg KOH/g) as determined by the constituents of the respective Mannich bases; the measured amine value of the respective Mannich bases in mg KOH/g as determined according to DIN 16945; the water content as a wt % of the respective Mannich bases; the viscosity as mPa·s of the respective Mannich bases at 25° C.; the viscosity as mPa·s of the respective Mannich bases at 40° C.; the refractive index of the respective Mannich bases at 25° C.; the pot life of the respective Mannich bases in minutes, wherein the respective Mannich bases are mixed with D.E.R.™ 331 (1 epoxy equivalent: 1 amine equivalent); and the hydrogen equivalent weight as grams per equivalent (g/eq) of respective Mannich base as determined by the constituents of the respective Mannich bases.

TABLE 2

| PROPERTY | Mannich Base 1 | Mannich Base 2 | Mannich Base 3 | Mannich Base 4 | Mannich Base 5 | Mannich Base 6 | Mannich Base 7 | Mannich Base 8 | Mannich Base 9 | Mannich Base 10 |
|---|---|---|---|---|---|---|---|---|---|---|
| Theoretical amine value (mg KOH/g) | 272 | 524 | 531 | 447 | 386 | 441 | 336 | 382 | 378 | 405 |
| Measured amine value (mg KOH/g) | 272 | 535 | 525 | 455 | 390 | 439 | 340 | 386 | 380 | 398 |
| Water content (wt %) | 0.35 | 0.50 | 0.40 | 0.36 | 0.50 | 0.22 | 0.40 | 0.27 | — | — |
| Viscosity at 25° C. (mPa·s) | — | 13000 | 500 | 1600 | 5600 | 32000 | — | 70000 | — | 16500 |

TABLE 2-continued

| PROPERTY | Mannich Base 1 | Mannich Base 2 | Mannich Base 3 | Mannich Base 4 | Mannich Base 5 | Mannich Base 6 | Mannich Base 7 | Mannich Base 8 | Mannich Base 9 | Mannich Base 10 |
|---|---|---|---|---|---|---|---|---|---|---|
| Viscosity at 40° C. (mPa·s) | 30000 | 2100 | 130 | 310 | 630 | 3500 | 10700 | 6600 | 125000 | 2000 |
| Refractive index at 25° C. | 1.5274 | 1.5137 | 1.5056 | 1.5111 | 1.5166 | 1.5183 | 1.5233 | 1.5216 | 1.5267 | 1.5172 |
| Pot life (minutes) | 25 | 168 | 83 | 43 | 27 | 64 | 31 | 44 | 129 | 44 |
| Hydrogen equivalent weight (g/eq) | 121 | 62 | 57 | 68 | 78 | 74 | 96 | 84 | 92 | 79 |

Adduct Preparation

Adducts 1 through 8 were prepared as follows: Amine was added to a flask and flask contents were heated to a reaction temperature of 90° C. The flask contents were heated to a reaction temperature of 140° C. when D-230 was included. Epoxy compound was then added dropwise to the flask while stirring. The flask contents were maintained to within ±5° C. of the reaction temperature. The flask contents were cooled to 40° C. one hour after the addition of the epoxy compound was completed. Table 3 shows the components, and their respective amounts in moles, used to prepare the respective adducts.

TABLE 3

| COMPONENT | Adduct 1 | Adduct 2 | Adduct 3 | Adduct 4 | Adduct 5 | Adduct 6 | Adduct 7 | Adduct 8 |
|---|---|---|---|---|---|---|---|---|
| D.E.R.™ 331 (moles) | 1 | 1.28 | 0.75 | 0.7 | 0.75 | — | — | — |
| oC-MGE (moles) | — | — | — | — | — | — | 1.25 | — |
| ptBP-MGE (moles) | — | — | — | — | — | 1.25 | — | 1.25 |
| MXDA (moles) | 4 | — | — | — | — | — | — | — |
| DETA (moles) | — | 5.11 | — | — | — | — | — | — |
| TMDA (moles) | — | — | 3 | — | — | — | — | — |
| D-230 (moles) | — | — | — | 2.79 | — | 2.5 | 2.5 | — |
| IPDA (moles) | — | — | — | — | 3 | — | — | 2.5 |

Various properties of adducts 1 through 8 were determined and the results are shown in Table 4, including the viscosity as mPa·s of the respective adducts at 25° C.; the viscosity as mPa·s of the respective adducts at 50° C.; and the hydrogen equivalent weight as grams per equivalent (g/eq) of respective adduct.

TABLE 4

| PROPERTY | Adduct 1 | Adduct 2 | Adduct 3 | Adduct 4 | Adduct 5 | Adduct 6 | Adduct 7 | Adduct 8 |
|---|---|---|---|---|---|---|---|---|
| Viscosity at 25° C. (mPa·s) | 20500 | 7000 | 1700 | 2300 | — | 211 | 150 | 3460 |
| Viscosity at 50° C. (mPa·s) | — | — | — | — | 29000 | — | — | — |
| Hydrogen equivalent weight (g/eq) | 65 | 43.5 | 64 | 102 | 74 | 109 | 101 | 82 |

Hardener Preparation

Mannich base 5 and Mannich base 8 were combined with some of the previously prepared adducts to provide hardener components 1 through 12, as indicated by Table 5. Table 5 shows the wt % of Mannich base 5 and the wt % of Mannich base 8 used with the respective hardener components. Table 5 also shows the wt % of non-reactive modifiers Sanko SP and Ruetasolv DI used with the respective hardener components.

TABLE 5

| COMPONENT | Hardener Component 1 | Hardener Component 2 | Hardener Component 3 | Hardener Component 4 | Hardener Component 5 | Hardener Component 6 | Hardener Component 7 | Hardener Component 8 | Hardener Component 9 | Hardener Component 10 | Hardener Component 11 | Hardener Component 12 |
|---|---|---|---|---|---|---|---|---|---|---|---|---|
| Mannich base 5 (wt %) | 50% | 50% | 50% | 50% | — | — | — | 50% | 33% | 40% | 40% | 40% |
| Mannich base 8 (wt %) | — | — | — | — | 50% | 50% | 50% | — | — | — | — | — |
| Adduct (wt %) | Adduct 1 (50%) | Adduct 2 (50%) | Adduct 3 (50%) | Adduct 4 (50%) | Adduct 2 (50%) | Adduct 3 (50%) | Adduct 4 (50%) | Adduct 1 (25%) | Adduct 3 (33%) | Adduct 3 (40%) | Adduct 4 (40%) | Adduct 3 (20%) |
| Adduct (wt %) | — | — | — | — | — | — | — | Adduct 3 (25%) | — | — | — | Adduct 1 (20%) |
| Sanko SP (non-reactive modifier) (wt %) | — | — | — | — | — | — | — | — | 33% | — | — | — |
| Ruetasolv DI (non reactive modifier) (wt %) | — | — | — | — | — | — | — | — | — | 20% | 20% | 20% |

Various properties of the hardener components 1 through 12 were determined and the results are shown in Tables 6A-6D. Table 6A shows the hydrogen equivalent weight as grams per equivalent (g/eq) of respective hardener components; the viscosity as mPa·s of the respective hardener components at 25° C.; and the viscosity as mPa·s of the respective hardener components at 40° C. Table 6B shows the grams of the respective hardener components mixed with 100 grams of D.E.R.™ 331; and the pot life in minutes of the mixtures. Table 6C shows the grams of the respective hardener components mixed with 100 grams of POLYPOX® E 403; and the pot life in minutes of the mixtures. Table 6D shows the grams of the respective hardener components mixed with 100 grams of D.E.R.™ 331/POLYPOX® VE 101592 (80 wt %:20 wt %); and the pot life in minutes of the mixtures of Row 6.8.

TABLE 6A

| PROPERTY | Hardener Component 1 | Hardener Component 2 | Hardener Component 3 | Hardener Component 4 | Hardener Component 5 | Hardener Component 6 | Hardener Component 7 | Hardener Component 8 | Hardener Component 9 | Hardener Component 10 | Hardener Component 11 | Hardener Component 12 |
|---|---|---|---|---|---|---|---|---|---|---|---|---|
| Hydrogen equivalent weight (g/eq) | 71 | 56 | 70 | 88 | 57 | 73 | 92 | 71 | 105 | 87 | 110 | 88 |
| Viscosity at 25° C. (mPa·s) | 9300 | 4700 | 2360 | 2900 | 11800 | 5900 | 5900 | 4550 | 13700 | 700 | 835 | 1200 |
| Viscosity at 40° C. (mPa·s) | 1600 | 1100 | 565 | 630 | 2350 | 1200 | 1100 | — | — | — | — | — |

TABLE 6B

| PROPERTY | Hardener Component 1 | Hardener Component 2 | Hardener Component 3 | Hardener Component 4 | Hardener Component 5 | Hardener Component 6 | Hardener Component 7 | Hardener Component 8 | Hardener Component 9 | Hardener Component 10 | Hardener Component 11 | Hardener Component 12 |
|---|---|---|---|---|---|---|---|---|---|---|---|---|
| Grams of hardener component per 100 grams D.E.R. ™ 331 | 39 | 31 | 39 | 48 | 31 | 40 | 51 | — | — | — | — | — |
| Pot life of hardener component + resin mixture (minutes) | 35 | 28 | 34 | 69 | 33 | 42 | 103 | — | — | — | — | — |

TABLE 6C

| PROPERTY | Hardener Component 1 | Hardener Component 2 | Hardener Component 3 | Hardener Component 4 | Hardener Component 5 | Hardener Component 6 | Hardener Component 7 | Hardener Component 8 | Hardener Component 9 | Hardener Component 10 | Hardener Component 11 | Hardener Component 12 |
|---|---|---|---|---|---|---|---|---|---|---|---|---|
| Grams of hardener component per 100 grams POLYPOX ® 403 | — | — | 36 | 46 | — | — | — | 37 | 55 | 45 | 57 | 46 |
| Pot life of hardener component + resin mixture (minutes) | — | — | 48 | 135 | — | — | — | 44 | 27 | 67 | 235 | 63 |

TABLE 6D

| PROPERTY | Hardener Component 1 | Hardener Component 2 | Hardener Component 3 | Hardener Component 4 | Hardener Component 5 | Hardener Component 6 | Hardener Component 7 | Hardener Component 8 | Hardener Component 9 | Hardener Component 10 | Hardener Component 11 | Hardener Component 12 |
|---|---|---|---|---|---|---|---|---|---|---|---|---|
| Grams of hardener component per 100 grams of an 80 wt %:20 wt % blend of D.E.R. ™ 331/ POLYPOX ® VE 101592 | — | — | 33 | 41 | — | — | — | 33 | 49 | — | — | — |
| Pot life of hardener component + resin mixture (minutes) | — | — | 51 | 149 | — | — | — | 48 | 29 | — | — | — |

Examples 1-17

The aromatic resin compound D.E.R.™ 331 and the polymeric glycidyl ether POLYPOX® VE 101592 were mixed to provide a resin component that was then mixed with a Mannich base, an adduct(s) and, for some Examples, a non-reactive modifier to provide curable compositions shown as Examples 1 through 17 of Table 7A. In each Example there was 100 grams of resin component total. Table 7A shows the wt % of the resin components for each Example. The resin components were mixed with a mass of Mannich base, adduct(s), and non-reactive modifier(s) as shown in Table 7A. Table 7A shows the wt % of each respective Mannich base, adduct(s), and non-reactive modifier(s) for the total mass thereof.

TABLE 7A

| EXAMPLE # | D.E.R.™ 331 (aromatic epoxy compound) Wt % of resin component | POLYPOX® VE 101592 (reactive diluent of polymeric glycidyl ether) | Grams of Mannich base + adduct(s) + modifier(s) | Mannich base — Mannich base 5 | Adduct — Adduct 1 | Adduct — Adduct 3 | Adduct — Adduct 4 | Non-reactive modifier — Sanko SP | Non-reactive modifier — Ruetasolv DI | Non-reactive modifier — UCAR™ Filmer IBT | Non-reactive modifier — DOWANOL® TpnB |
|---|---|---|---|---|---|---|---|---|---|---|---|
| | | | | Wt % Mannich base/adduct(s)/non-reactive modifier(s) | | | | | | | |
| Example 1 | 80 | 20 | 33 | 50 | — | 50 | — | — | — | — | — |
| Example 2 | 80 | 20 | 33 | 50 | 50 | — | — | — | — | — | — |
| Example 3 | 80 | 20 | 50 | 33.3 | 33.3 | — | — | 33.3 | — | — | — |
| Example 4 | 80 | 20 | 49 | 33.3 | — | 33.3 | — | 33.3 | — | — | — |
| Example 5 | 80 | 20 | 33 | 50 | 25 | 25 | — | — | — | — | — |
| Example 6 | 80 | 20 | 50 | 33.3 | 16.7 | 16.7 | — | 33.3 | — | — | — |
| Example 7 | 80 | 20 | 41 | 40 | — | 40 | — | — | — | 20 | — |
| Example 8 | 80 | 20 | 55 | 30 | — | 30 | — | — | — | 40 | — |
| Example 9 | 80 | 20 | 41 | 40 | — | 40 | — | — | — | — | 20 |
| Example 10 | 80 | 20 | 55 | 30 | — | 30 | — | — | — | — | 40 |
| Example 11 | 80 | 20 | 62 | 33.3 | — | — | 33.3 | 33.3 | — | — | — |
| Example 12 | 80 | 20 | 50 | 41 | — | — | 41 | — | 18 | — | — |
| Example 13 | 80 | 20 | 52 | 40 | — | — | 40 | — | — | 20 | — |
| Example 14 | 80 | 20 | 69 | 30 | — | — | 30 | — | — | 40 | — |
| Example 15 | 80 | 20 | 52 | 40 | — | — | 40 | — | — | — | 20 |
| Example 16 | 80 | 20 | 57 | 30 | — | — | 30 | — | — | — | 40 |
| Example 17 | 80 | 20 | 41 | 50 | — | — | 50 | — | — | — | — |

Comparative Examples A-Y

The aromatic epoxy compound POLYPOX® E 403 was mixed with a Mannich base, an adduct (s) and, for some Examples, a non-reactive modifier to provide curable compositions shown as Comparative Examples A-Y of Table 7B. In each Comparative Example there was 100 grams of aromatic epoxy compound. Table 7B shows the wt % of the resin component for each Comparative Example. The resin components were mixed with a mass of Mannich base, adduct(s), and non-reactive modifier(s) as shown in Table 7B. Table 7B shows the wt % of each respective Mannich base, adduct(s), and non-reactive modifier(s) for the total mass thereof.

TABLE 7B

| COMPARATIVE EXAMPLE # | POLYPOX® E 403 (aromatic epoxy compound) Wt % of resin component | Grams of Mannich base + adduct(s) + modifier(s) | Mannich base — Mannich base 5 | Adduct — Adduct 1 | Adduct — Adduct 2 | Adduct — Adduct 3 | Adduct — Adduct 4 | Non-reactive modifier — SP | Non-reactive modifier — LS 500 | Non-reactive modifier — Ruetasolv DI | Non-reactive modifier — IBT | Non-reactive modifier — TpnB |
|---|---|---|---|---|---|---|---|---|---|---|---|---|
| | | | Wt % Mannich base/adduct(s)/non-reactive modifier(s) | | | | | | | | | |
| Comparative Example A | 100 | 36 | 50 | — | — | 50 | — | — | — | — | — | — |
| Comparative Example B | 100 | 29 | 50 | — | 50 | — | — | — | — | — | — | — |

TABLE 7B-continued

| COMPARATIVE EXAMPLE # | POLYPOX® E 403 (aromatic epoxy compound) Wt % of resin component | Grams of Mannich base + adduct(s) + modifier(s) | Mannich base Mannich base 5 | Adduct 1 | Adduct 2 | Adduct 3 | Adduct 4 Wt % Mannich base/adduct(s)/non-reactive modifier(s) | SP | LS 500 | Ruetasolv DI | IBT | TpnB |
|---|---|---|---|---|---|---|---|---|---|---|---|---|
| Comparative Example C | 100 | 37 | 50 | 50 | — | — | — | — | — | — | — | — |
| Comparative Example D | 100 | 55 | 33.3 | 33.3 | — | — | — | 33.3 | — | — | — | — |
| Comparative Example E | 100 | 44 | 33.3 | — | 33.3 | — | — | 33.3 | — | — | — | — |
| Comparative Example F | 100 | 55 | 33.3 | — | — | 33.3 | — | 33.3 | — | — | — | — |
| Comparative Example G | 100 | 37 | 50 | 25 | — | 25 | — | — | — | — | — | — |
| Comparative Example H | 100 | 58 | 33.3 | 16.7 | — | 16.7 | — | 33.3 | — | — | — | — |
| Comparative Example I | 100 | 52 | 33.3 | — | 16.7 | 16.7 | — | 33.3 | — | — | — | — |
| Comparative Example J | 100 | 55 | 31.7 | — | 15.8 | 15.8 | — | 31.7 | 5 | — | — | — |
| Comparative Example K | 100 | 60 | 31.7 | — | — | 31.7 | — | 31.7 | 5 | — | — | — |
| Comparative Example L | 100 | 49 | 31.7 | — | 31.7 | — | — | — | 5 | — | — | — |
| Comparative Example M | 100 | 45 | 40 | — | — | 40 | — | — | — | 20 | — | — |
| Comparative Example N | 100 | 46 | 40 | 20 | — | 20 | — | — | — | 20 | — | — |
| Comparative Example O | 100 | 45 | 40 | — | — | 40 | — | — | — | — | 20 | — |
| Comparative Example P | 100 | 61 | 30 | — | — | 30 | — | — | — | — | 40 | — |
| Comparative Example Q | 100 | 45 | 40 | — | — | 40 | — | — | — | — | — | 20 |
| Comparative Example R | 100 | 61 | 30 | — | — | 30 | — | — | — | — | — | 40 |
| Comparative Example S | 100 | 46 | 50 | — | — | — | 50 | — | — | — | — | — |
| Comparative Example T | 100 | 69 | 33.3 | — | — | — | 33.3 | 33.3 | — | — | — | — |
| Comparative Example U | 100 | 57 | 33.3 | — | — | — | 40 | — | — | 20 | — | — |
| Comparative Example V | 100 | 57 | 40 | — | — | — | 40 | — | — | — | 20 | — |
| Comparative Example W | 100 | 76 | 30 | — | — | — | 30 | — | — | — | 40 | — |
| Comparative Example X | 100 | 57 | 40 | — | — | — | 40 | — | — | — | — | 20 |
| Comparative Example Y | 100 | 76 | 30 | — | — | — | 30 | — | — | — | — | 40 |

Properties of the Examples of Table 7A and Comparative Examples of Table 7B were determined, and the results are shown in Tables 8A, 8B, 9A, and 9B. These Tables show the viscosity of the hardener component and non-reactive modifier, if any, in mPa·s at 25° C., and the Shore D hardness determined by ASTM D 2240, after curing for a number of hours (h) at a particular relative humidity. The curing at 23° C. occurred at 50 percent relative humidity, the curing at 13° C. occurred at 80 percent relative humidity, and the curing at 7° C. occurred at 65 percent relative humidity.

TABLE 8A

| EXAMPLE # | Viscosity of the hardener component + non-reactive modifier (mPa·s) | Shore D hardness after curing at 23° C. | | | | | | | Shore D hardness after curing at 13° C. | | Shore D hardness after curing at 7° C. | |
|---|---|---|---|---|---|---|---|---|---|---|---|---|
| | | 4.5 h | 5.0 h | 6.0 h | 6.5 h | 7.0 h | 8.0 h | 24 h | 8.0 h | 24 h | 8.0 h | 24 h |
| Example 1 | 2360 | — | 13 | — | 28 | — | 45 | 76 | — | 65 | — | 75 |
| Example 2 | 9300 | — | 22 | — | 46 | — | 62 | 78 | — | 71 | — | 71 |
| Example 3 | — | 32 | — | 64 | — | 70 | 71 | 78 | 37 | 74 | 38 | 72 |
| Example 4 | 13700 | — | — | 37 | — | 49 | 56 | 74 | 25 | 66 | 28 | 68 |
| Example 5 | — | — | — | 23 | — | 40 | 56 | 76 | — | 66 | — | 64 |
| Example 6 | — | 23 | — | 55 | — | 60 | 61 | 77 | 33 | 56 | 48 | 70 |

TABLE 8A-continued

| EXAMPLE # | Viscosity of the hardener component + non-reactive modifier (mPa·s) | Shore D hardness after curing at 23° C. | | | | | | | Shore D hardness after curing at 13° C. | | Shore D hardness after curing at 7° C. | |
|---|---|---|---|---|---|---|---|---|---|---|---|---|
| | | 4.5 h | 5.0 h | 6.0 h | 6.5 h | 7.0 h | 8.0 h | 24 h | 8.0 h | 24 h | 8.0 h | 24 h |
| Example 7 | 1300 | — | — | — | — | — | 10 | 68 | — | 48 | — | 30 |
| Example 8 | 620 | — | — | — | — | — | — | 45 | — | 21 | — | 20 |
| Example 9 | 585 | — | — | — | — | — | 10 | 63 | — | 38 | — | 25 |
| Example 10 | 175 | — | — | — | — | — | — | 25 | — | 10 | — | — |

TABLE 8B

| COMPARATIVE EXAMPLE # | Viscosity of the hardener component + non-reactive modifier (mPa·s) | Shore D hardness after curing at 23° C. | | | | | | | Shore D hardness after curing at 13° C. | | Shore D hardness after curing at 7° C. | |
|---|---|---|---|---|---|---|---|---|---|---|---|---|
| | | 4.5 h | 5.0 h | 6.0 h | 6.5 h | 7.0 h | 8.0 h | 24 h | 8.0 h | 24 h | 8.0 h | 24 h |
| Comparative Example A | 2360 | — | — | 16 | — | 35 | 58 | 79 | — | 74 | — | 71 |
| Comparative Example B | 4700 | 20 | — | 44 | — | 55 | 68 | 79 | — | 72 | 10 | 74 |
| Comparative Example C | 9300 | 13 | — | 43 | — | 55 | 72 | 79 | — | 70 | 13 | 73 |
| Comparative Example D | — | — | 59 | 70 | — | — | 74 | 74 | 35 | 70 | 45 | 69 |
| Comparative Example E | — | — | 53 | 65 | — | — | 70 | 74 | 23 | 72 | 43 | 73 |
| Comparative Example F | 13700 | — | 38 | 53 | — | — | 64 | 72 | 23 | 73 | 18 | 72 |
| Comparative Example G | 4500 | — | — | 43 | — | 61 | 63 | 78 | — | 67 | — | 75 |
| Comparative Example H | — | 49 | — | 66 | — | 70 | 72 | 79 | 26 | 72 | 24 | 73 |
| Comparative Example I | — | 50 | — | 65 | — | 72 | 73 | 78 | 27 | 75 | 38 | 75 |
| Comparative Example J | — | 40 | — | 61 | — | 63 | 65 | 76 | 14 | 69 | 15 | 68 |
| Comparative Example K | — | 27 | — | 50 | — | 57 | 58 | 76 | 13 | 63 | 20 | 65 |
| Comparative Example L | — | 53 | — | 69 | — | 72 | 73 | 80 | 25 | 75 | 18 | 77 |
| Comparative Example M | 700 | — | — | — | — | 18 | 25 | 73 | — | 56 | — | 61 |
| Comparative Example N | 1200 | — | — | — | — | 32 | 41 | 82 | — | 68 | — | 71 |
| Comparative Example O | 1300 | — | — | — | — | 15 | 25 | 73 | — | 62 | — | 58 |
| Comparative Example P | 620 | — | — | — | — | — | — | 47 | — | 28 | — | 23 |
| Comparative Example Q | 585 | — | — | — | — | — | 20 | 68 | — | 48 | — | 54 |
| Comparative Example R | 175 | — | — | — | — | — | — | 28 | — | 10 | — | 11 |

TABLE 9A

| EXAMPLE # | Viscosity of the hardener component + non-reactive modifier (mPa·s) | Shore D hardness after curing at 23° C. | | | | Shore D hardness after curing at 13° C. | | | | Shore D hardness after curing at 7° C. | | |
|---|---|---|---|---|---|---|---|---|---|---|---|---|
| | | 16 h | 18 h | 24 h | 48 h | 16 h | 18 h | 24 h | 48 h | 18 h | 24 h | 48 h |
| Example 11 | — | 56 | 63 | 67 | 74 | 23 | 28 | 45 | 72 | 24 | 34 | 64 |
| Example 12 | 910 | 17 | 22 | 38 | 71 | — | — | — | 38 | — | — | 28 |

TABLE 9A-continued

| EXAMPLE # | Viscosity of the hardener component + non-reactive modifier (mPa·s) | Shore D hardness after curing at 23° C. | | | | Shore D hardness after curing at 13° C. | | | | Shore D hardness after curing at 7° C. | | |
|---|---|---|---|---|---|---|---|---|---|---|---|---|
| | | 16 h | 18 h | 24 h | 48 h | 16 h | 18 h | 24 h | 48 h | 18 h | 24 h | 48 h |
| Example 13 | 1300 | 16 | 20 | 39 | 67 | — | — | — | 38 | — | — | 28 |
| Example 14 | 550 | — | — | 14 | 35 | — | — | — | — | — | — | — |
| Example 15 | 600 | — | 12 | 25 | 60 | — | — | — | 20 | — | — | 18 |
| Example 16 | 155 | 22 | 25 | 49 | 73 | — | — | — | 48 | — | — | 22 |

TABLE 9B

| COMPARATIVE EXAMPLE # | Viscosity of the hardener component + non-reactive modifier (mPa·s) | Shore D hardness after curing at 23° C. | | | | Shore D hardness after curing at 13° C. | | | | Shore D hardness after curing at 7° C. | | |
|---|---|---|---|---|---|---|---|---|---|---|---|---|
| | | 16 h | 18 h | 24 h | 48 h | 16 h | 18 h | 24 h | 48 h | 18 h | 24 h | 48 h |
| Comparative Example S | 2900 | 58 | 62 | 65 | 80 | — | — | 20 | 71 | — | 20 | 71 |
| Comparative Example T | — | 61 | 63 | 73 | 78 | 25 | 25 | 52 | 70 | — | 42 | 67 |
| Comparative Example U | 835 | — | 25 | 48 | 74 | — | — | 9 | 53 | — | 9 | 52 |
| Comparative Example V | 1300 | 22 | 25 | 49 | 73 | — | — | — | 48 | — | — | 22 |
| Comparative Example W | 550 | — | — | 12 | 38 | — | — | — | 12 | — | — | — |
| Comparative Example X | 600 | — | 14 | 30 | 67 | — | — | — | 24 | — | — | 12 |
| Comparative Example Y | 155 | — | — | — | 20 | — | — | — | — | — | — | — |

The Tg of some Examples and Comparative Examples, as described above, was measured and the results are shown in Tables 10A and 10B. The Examples and Comparative Examples were thermoanalyzed with a Mettler Toledo DSC822, available from Mettler-Toledo Inc. The active glass transition temperature ($Tg_A$) was measured in the range of 20° C. to 120° C. The potential glass transition temperature ($Tg_P$) was measured after a 10 minute postcuring at 180° C. in the range of 20° C. to 130° C. following Deutsches Institut für Normung (DIN), or German Institute for Standardization DIN 65467, heating rate 15 kelvin/minute.

TABLE 10A

| EXAMPLE # | $Tg_A$ (° C.) | $Tg_P$ (° C.) |
|---|---|---|
| Example 1 | 54.9 | 63.0 |
| Example 2 | 53.9 | 64.1 |
| Example 3 | 48.9 | 59.5 |
| Example 5 | 55.3 | 66.4 |
| Example 6 | 47.8 | 54.2 |
| Example 11 | 43.3 | 51.4 |
| Example 12 | 41.7 | 51.0 |
| Example 13 | 40.4 | 49.8 |
| Example 15 | 42.1 | 55.2 |

TABLE 10B

| COMPARATIVE EXAMPLE # | $Tg_A$ (° C.) | $Tg_P$ (° C.) |
|---|---|---|
| Comparative Example A | 59.5 | 72.7 |
| Comparative Example B | 61.8 | 81.5 |
| Comparative Example D | 52.3 | 57.2 |
| Comparative Example E | 55.9 | 62.2 |
| Comparative Example F | 53.0 | 55.1 |
| Comparative Example G | 59.4 | 79.8 |
| Comparative Example H | 51.6 | 55.4 |
| Comparative Example I | 53.9 | 58.3 |
| Comparative Example M | 51.3 | 58.5 |
| Comparative Example O | 47.5 | 57.2 |
| Comparative Example Q | 44.8 | 58.1 |
| Comparative Example R | 39.1 | 49.3 |
| Comparative Example S | 57.0 | 65.7 |
| Comparative Example T | 46.9 | 52.1 |

TABLE 10B-continued

| COMPARATIVE EXAMPLE # | Tg$_A$ (° C.) | Tg$_P$ (° C.) |
|---|---|---|
| Comparative Example U | 39.5 | 57.0 |
| Comparative Example X | 41.2 | 52.2 |

The chemical resistance of POLYPOX® E 403 mixed with POLYPOX® IH 7009 (1 epoxy equivalent to 1 amine equivalent), herein Comparative Example Z, Comparative Example A, and Comparative Example M were evaluated by Shore D hardness testing (ASTM D 2240) and determination of a percent change in hardness on the Shore D hardness scale. Comparative Examples A and M each have a hardener component that includes the Mannich base and adduct as disclosed herein, in contrast to Comparative Example Z. A relatively lesser percent change in hardness indicated a greater chemical resistance and a relatively greater percent change in hardness indicated a lower chemical resistance. Various solutions were used for the chemical resistance tests including a five wt % acetic acid solution, a fifteen wt % ethanol solution, and artificial wine. The Shore D hardness, prior to exposure to the solutions, was measured for each of the cured compositions, and is shown in Table 11 as initial hardness.

A sample of each of Comparative Example Z, Comparative Example A, and Comparative Example M was exposed to the solutions for 168 h by placing a cotton pad that is saturated with the solution on the sample and covering the pad and sample. After 24 h of exposure, 48 h of exposure, and 168 h of exposure the Shore D hardness of the samples was measured. The Shore D hardness measurements are shown in Table 11. The percent change in Shore D hardness, as shown as percent % Δ Shore D hardness in Table 11, was determined with the initial hardness and the final hardness that is the hardness after 168 h of exposure to the solutions to the initial hardness. The percent change in Shore D hardness was calculated as (1−(final hardness/initial hardness))*100, where a negative percent change in hardness indicated a greater value for initial hardness than final hardness.

B.P.G. 5b, a five wt % acetic acid solution, a ten wt % acetic acid, gasoline, xylene, MIBK, a fifteen wt % ethanol solution, and artificial wine. The Shore D hardness, prior to exposure to the solutions for each of the cured compositions, was measured and is shown in Table 12 as initial Shore D hardness.

Each sample was exposed to the solutions for a period of time as shown in Table 12; Shore D hardness measurements were taken and the results are shown in Table 12; and the percent change in Shore D hardness, as described above, was determined and is shown in Table 12.

TABLE 12

| SOLUTION | | Comparative Example AA (Initial Shore D hardness 81) | Example 17 (Initial Shore D hardness 81) | Example 1 (Initial Shore D hardness 82) |
|---|---|---|---|---|
| Sulfuric acid | Shore D hardness after 24 h | 76 | 78 | 82 |
| | Shore D hardness after 48 h | 76 | 78 | 81 |
| | Shore D hardness after 168 h | 71 | 75 | 81 |
| | % Δ Shore D Hardness | −12.35 | −7.41 | −1.22 |
| Sodium hydroxide | Shore D hardness after 24 h | 81 | 81 | 82 |
| | Shore D hardness after 48 h | 81 | 81 | 82 |
| | Shore D hardness after 168 h | 81 | 80 | 81 |
| | % Δ Shore D Hardness | 0.00 | −1.23 | −1.22 |

TABLE 11

| | Acetic Acid | | | | Ethanol | | | | Artificial Wine | | | |
|---|---|---|---|---|---|---|---|---|---|---|---|---|
| COMPARATIVE EXAMPLE # | Initial Shore D Hardness | 24 h | 48 h | 168 h | % Δ Shore D Hardness | 24 h | 48 h | 168 h | % Δ Shore D Hardness | 24 h | 48 h | 168 h | % Δ Shore D Hardness |
| Comparative Example Z | 81 | 66 | 63 | 55 | −32.10 | 79 | 79 | 78 | −3.70 | 77 | 75 | 77 | −4.90 |
| Comparative Example A | 78 | 77 | 75 | 74 | −5.10 | 79 | 79 | 77 | −1.30 | 77 | 77 | 77 | −1.30 |
| Comparative Example M | 79 | 74 | 74 | 72 | −8.86 | 77 | 77 | 78 | −1.27 | 77 | 77 | 78 | −1.27 |

The data in Table 11 shows that both Comparative Example A and Comparative Example M have improved chemical resistance, shown by the relative percent change in hardness after exposures to acetic acid, ethanol, and artificial wine for 168 h, as compared to Comparative Example Z.

The chemical resistance of a mixture of 80 wt % D.E.R.™ 331 and 20 wt % POLYPOX® VE 101592 combined with POLYPOX® IH 7009 (1 epoxy equivalent to 1 amine equivalent), herein Comparative Example AA, Example 17, and Example 1 as described above, was evaluated with chemical exposures to various solutions including a twenty wt % sulfuric acid solution, a twenty wt % sodium hydroxide solution, TABLE 12-continued

| SOLUTION | | Comparative Example AA (Initial Shore D hardness 81) | Example 17 (Initial Shore D hardness 81) | Example 1 (Initial Shore D hardness 82) |
|---|---|---|---|---|
| B.P.G. 5b | Shore D hardness after 24 h | 71 | 71 | 74 |

TABLE 12-continued

| SOLUTION | | Comparative Example AA (Initial Shore D hardness 81) | Example 17 (Initial Shore D hardness 81) | Example 1 (Initial Shore D hardness 82) |
|---|---|---|---|---|
| | Shore D hardness after 48 h | 67 | 69 | 72 |
| | Shore D hardness after 168 h | 61 | 62 | 69 |
| | % Δ Shore D Hardness | −24.69 | −23.46 | −15.85 |
| Acetic acid 5% | Shore D hardness after 24 h | 63 | 70 | 77 |
| | Shore D hardness after 48 h | 56 | 67 | 75 |
| | Shore D hardness after 168 h | 42 | 60 | 69 |
| | % Δ Shore D Hardness | −48.15 | −25.93 | −15.85 |
| Acetic acid 10% | Shore D hardness after 24 h | 56 | 68 | 72 |
| | Shore D hardness after 48 h | 48 | 62 | 69 |
| | Shore D hardness after 168 h | 28 | 51 | 58 |
| | % Δ Shore D Hardness | −65.43 | −37.04 | −29.27 |
| Gasoline | Shore D hardness after 24 h | 82 | 80 | 80 |
| | Shore D hardness after 48 h | 81 | 80 | 80 |
| | Shore D hardness after 168 h | 81 | 79 | 80 |
| | % Δ Shore D Hardness | 0.00 | −2.47 | −2.44 |
| Xylene | Shore D hardness after 24 h | 70 | 65 | 69 |
| | Shore D hardness after 48 h | 67 | 60 | 68 |
| | Shore D hardness after 168 h | 59 | 50 | 61 |
| | % Δ Shore D Hardness | −27.16 | −38.27 | −25.61 |
| Methyl isobutyl ketone | Shore D hardness after 24 h | 75 | 65 | 67 |
| | Shore D hardness after 48 h | 73 | 60 | 67 |
| | Shore D hardness after 168 h | 65 | 54 | 59 |
| | % Δ Shore D Hardness | −19.75 | −33.33 | −28.05 |
| Ethanol 15% | Shore D hardness after 24 h | 79 | 78 | 81 |
| | Shore D hardness after 48 h | 78 | 78 | 80 |
| | Shore D hardness after 168 h | 76 | 79 | 80 |
| | % Δ Shore D Hardness | −6.17 | −2.47 | −2.44 |
| Artificial wine | Shore D hardness after 24 h | 78 | 78 | 82 |
| | Shore D hardness after 48 h | 77 | 78 | 82 |
| | Shore D hardness after 168 h | 76 | 79 | 81 |
| | % Δ Shore D Hardness | −6.17 | −2.47 | −1.22 |

The data in Table 12 shows that both Example 17 and Example 1 have improved chemical resistance, shown by the relative percent changes in hardness after exposures to sulfuric acid, B.P.G. 5b, five wt % acetic acid solution, ten wt % acetic acid solution, fifteen wt % ethanol solution, and artificial wine for 168 h, as compared to Comparative Example AA.

What is claimed:

1. A curable composition comprising:
   a resin component that includes;
      an epoxy compound that is selected from the group consisting of aromatic epoxy compounds, alicyclic epoxy compounds, aliphatic epoxy compounds, and combinations thereof; and
      a reactive diluent that includes a triglycidyl ether of trimethylolpropan octadeca ethoxylate; and
   a hardener component that includes;
      an adduct formed from the combination of the epoxy compound and a first amine, wherein the first amine comprises a non-cyclic aliphatic polyamine; and
      a Mannich base formed from a reaction of formaldehyde, a phenol compound, and a second amine selected from the group consisting of arylaliphatic polyamines, cycloaliphatic polyamines, and combinations thereof, wherein the Mannich base has a viscosity of from 100 mPa·s to 10,000 mPa·s at 25° C. and a hydrogen equivalent weight of from 60 g/eq to 180 g/eq; and the adduct has a viscosity of from 500 mPa·s to 50,000 mPa·s at 25° C. and a hydrogen equivalent weight of from 60 g/eq to 100 g/eq.

2. The curable composition of claim 1, wherein the phenol compound is selected from the group consisting of monophenols, diphenols, polyphenols, and combinations thereof.

3. The curable composition of claim 2, wherein the epoxy compound is an aromatic epoxy compound; and the second amine is isophorone diamine; and the phenol compound is para-tertiary-butylphenol.

4. The curable composition of claim 1, wherein the reactive diluent is less than 60 weight percent of the total weight of the resin component; the adduct is from 10 weight percent to 90 weight percent of the hardener component; and the Mannich base is from 10 to 90 weight percent of the hardener component, such that the weight percent of the adduct and the weight percent of the Mannich base equal one hundred weight percent of the hardener component.

5. The curable composition of claim 1, wherein the curable composition has a viscosity of from 1,000 mPa·s to 10,000 mPa·s at 25° C.; and a pot life of from 15 minutes to 90 minutes.

6. An article comprising a substrate and a coating on the substrate, wherein the coating includes a cured composition of the curable composition of claim 1.

7. The article of claim 6, wherein the Mannich base is formed from a reaction of formaldehyde, para-tertiary-butylphenol, and isophorone diamine.

8. The article of claim 6, wherein the adduct is from 10 weight percent to 90 weight percent of the hardener component; and the Mannich base is from 10 weight percent to 90 weight percent of the hardener component, such that the weight percent of the adduct and the weight percent of the Mannich base equal one hundred weight percent of the hardener component.

9. The article of claim 6, wherein the cured composition has a glass transition temperature within a range of from 40° C. to 80° C.; and a hardness within a range of from 76 to 84 on a Shore D hardness scale.

* * * * *